(12) United States Patent
Hosein et al.

(10) Patent No.: US 9,330,505 B2
(45) Date of Patent: May 3, 2016

(54) AUTOMATIC SEARCH BASED ON DETECTED USER INTEREST IN VEHICLE

(71) Applicant: eBay Inc., San Jose, CA (US)

(72) Inventors: Marc Peter Hosein, Saratoga, CA (US);
Steve Yankovich, San Jose, CA (US);
Steve Romero, Portland, OR (US);
Selina Lam, Castro Valley, CA (US);
Krystal Rose Higgins, Campbell, CA (US)

(73) Assignee: eBay Inc., San Jose, CA (US)

( * ) Notice: Subject to any disclaimer, the term of this patent is extended or adjusted under 35 U.S.C. 154(b) by 199 days.

(21) Appl. No.: 13/965,407

(22) Filed: Aug. 13, 2013

(65) Prior Publication Data

US 2014/0052745 A1    Feb. 20, 2014

Related U.S. Application Data

(60) Provisional application No. 61/682,973, filed on Aug. 14, 2012.

(51) Int. Cl.
G07C 5/00    (2006.01)
G06Q 30/08    (2012.01)
G06F 17/30    (2006.01)
G06Q 10/06    (2012.01)

(52) U.S. Cl.
CPC .......... *G07C 5/008* (2013.01); *G06F 17/30386* (2013.01); *G06Q 10/06* (2013.01); *G06Q 30/08* (2013.01); *G07C 5/006* (2013.01)

(58) Field of Classification Search
None
See application file for complete search history.

(56) References Cited

U.S. PATENT DOCUMENTS

| | | | |
|---|---|---|---|
| 2008/0088597 A1* | 4/2008 | Prest | G06F 3/0338 345/173 |
| 2009/0083141 A1* | 3/2009 | Craine | 705/14 |
| 2009/0318777 A1* | 12/2009 | Kameyama | A61B 5/16 600/301 |
| 2010/0044121 A1* | 2/2010 | Simon | G06F 3/03547 178/18.03 |
| 2010/0235891 A1* | 9/2010 | Oglesbee | H04L 67/1095 726/5 |
| 2010/0274480 A1* | 10/2010 | McCall | G01C 31/3664 701/408 |
| 2011/0004523 A1* | 1/2011 | Giuli | G01C 21/36 705/14.58 |
| 2011/0096036 A1* | 4/2011 | McIntosh | G06F 3/043 354/177 |
| 2011/0298702 A1* | 12/2011 | Sakata | G06F 3/013 345/156 |
| 2012/0116550 A1* | 5/2012 | Hoffman | A63B 71/0622 700/91 |
| 2012/0271713 A1* | 10/2012 | Nussel et al. | 705/14.53 |
| 2013/0024113 A1* | 1/2013 | Weng et al. | 701/455 |
| 2013/0303192 A1* | 11/2013 | Louboutin | G06Q 30/0261 455/456.3 |
| 2014/0025660 A1* | 1/2014 | Mohammed | G06F 17/30554 707/722 |
| 2014/0026156 A1* | 1/2014 | Deephanphongs | H04N 21/25866 725/12 |

* cited by examiner

*Primary Examiner* — Hung Le
(74) *Attorney, Agent, or Firm* — Schwegman Lundberg & Woesnner, P.A.

(57) ABSTRACT

A method of automatically performing a search based on user interest detected in a vehicle is provided. A user interest of a user in a vehicle is detected by examining sensor information from one or more sensors in the vehicle. A search is automatically performed for items relevant to the user interest. A user interface in the vehicle is then caused to display the items relevant to the user interest.

14 Claims, 9 Drawing Sheets

US 9,330,505 B2

AUTOMATIC SEARCH BASED ON DETECTED USER INTEREST IN VEHICLE

BACKGROUND

Recently, it has been more common for users to utilize electronic devices in moving vehicles, as in, for example, automobiles. The user interface may be displayed on an in-dash computer screen or may be located on a smartphone, which may be carried or may be physically mounted on a dashboard of the vehicle, for example. Performing searches, such as, for example, Internet or database searches, may be dangerous for a user to perform while driving. Such searches often require data entry. Having a driver type in characters while driving may not be safe. While recent implementations utilize voice recognition, these implementations still require the attention of the user be diverted while speaking search commands. Some studies have found that voice-based commands are no safer to use than physically typing while driving.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Although the present embodiments have been described with reference to specific example embodiments, it will be evident that various modifications and changes may be made to these embodiments without departing from the broader spirit and scope of the embodiments. Accordingly, the specification and drawings are to be regarded in an illustrative rather than a restrictive sense.

In an example embodiment, a search is automated in a vehicle. This automated search is performed based on one or more detected user interests. In an example embodiment, the detected user interests are based on information detected about the environment in the vehicle. In one specific example embodiment, user actions within the vehicle, such as tapping a finger to a song or singing along with a song may be used to determine that the user has specific interest in the song or topic related to the song (e.g., artist, album, etc.). Once this user interest has been determined, an automated search may be performed based on the interest and the results returned to the user without requiring express interaction on the part of the user. For example, a user tapping his fingers to a song of a particular band may receive search results including item listings of concert tickets for the band that performs the song.

Figure 1:
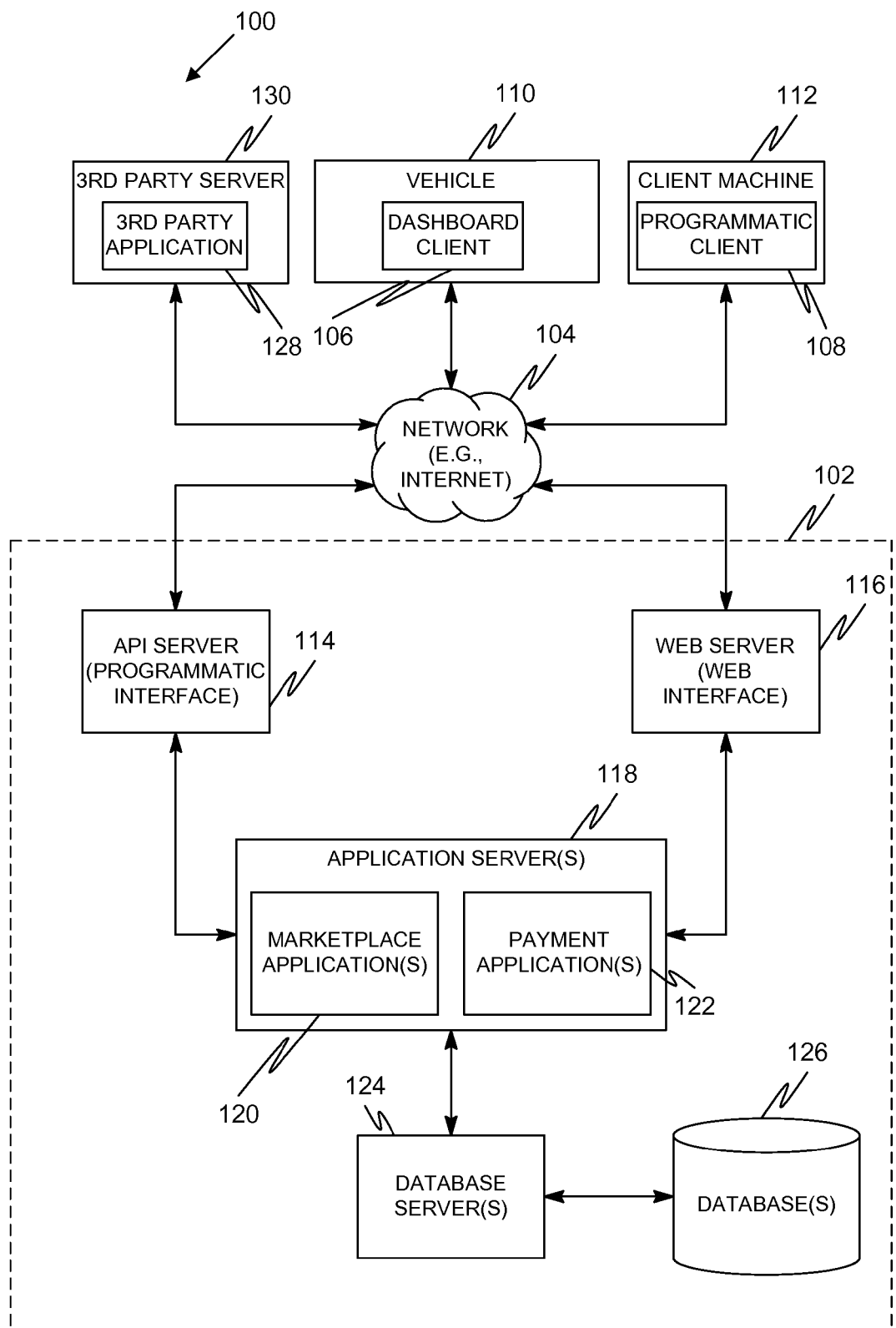
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or Wide Area Network (WAN)) to one or more clients. FIG. 1 illustrates, for example, a dashboard client 106 (e.g., software running in a dashboard), and a programmatic client 108 executing on respective machines, namely vehicle 110 and client machine 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The dashboard client 106 accesses the various marketplace and payment applications 120 and 122 via a web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
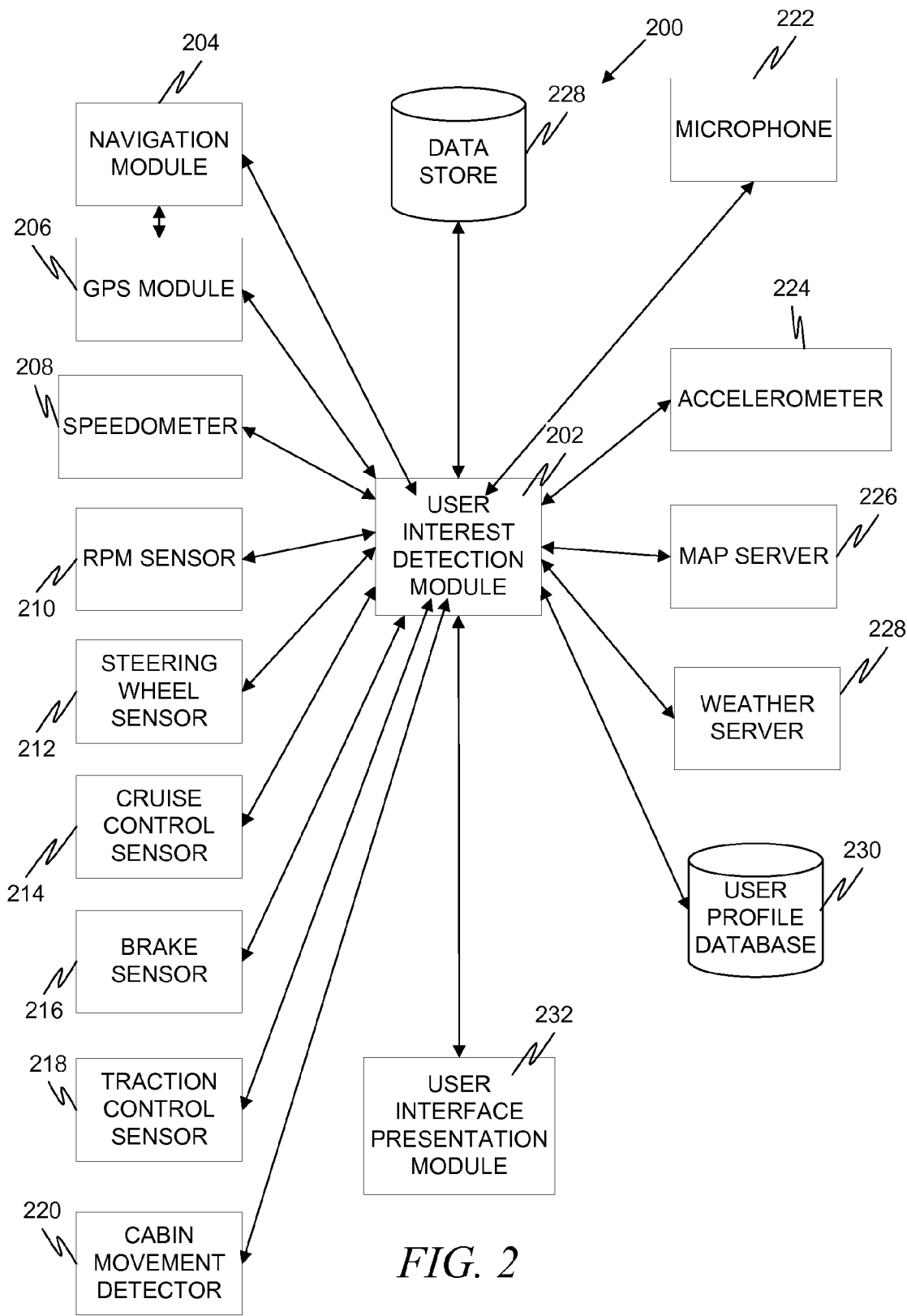
FIG. 2 is a diagram illustrating a system, in accordance with an example embodiment.

User interests may be detected through a number of different environmental sensors or information sources. FIG. 2 is a diagram illustrating a system, in accordance with an example embodiment. The system 200 may include a user interest detection module 202. Coupled to the user interest detection module may be various information sources and/or sensors 204-226 from which the user interest detection module 202 may gather information related to user interests. These various information sources and/or sensors 204-226 may be located in a vehicle 110, in a mobile device travelling in the vehicle 110, or outside the vehicle 110. Presented here are a number of examples of these information sources and/or sensors 204-226, but the disclosure is not limited to the examples provided. Additionally, not all embodiments will contain each of these information sources and/or sensors 204-226, and in fact some embodiments may rely on a single information source and/or sensor 204-226. Indeed, certain types of information may be gathered from various alternative mechanisms. As an example, destination information may be gathered from examining a navigation module 204 and determining a destination that the user has programmed into the navigation module 204. Alternatively, destination information may be inferred by using a current location of the vehicle 110 from a GPS module 206 and examining past driving patterns. Other possible sensors that might be commonly located within the vehicle 110 may be a speedometer 208, which gauges speed; an RPM sensor 210, which could be used to generally gauge acceleration; steering wheel sensor 212, which could be used to gauge how much the vehicle 110 is moving laterally and/or tapping motions made by the user on the steering wheel; cruise control sensor 214, which may be used to gauge whether cruise control is engaged; brake sensor 216, which may be used to gauge whether the vehicle 110 is currently braking; and traction control sensor 218, which may be used to gauge whether traction control is currently engaged. Additionally, a cabin movement detector 220 may be used to detect physical movement by the user (such as moving hands) within the cabin. In an example embodiment, the cabin movement detector 220 is a camera. Furthermore, a microphone 222 may be used to capture environmental sounds, such as sounds of a user singing while driving, as well as sounds outside the vehicle 110, such as ocean or animal noises that may help in determining a user interest.

An accelerometer 224, such as those commonly found in smartphones, could also be accessed.

Also presented are information sources 226-230 that may commonly be located outside of the vehicle 110, such as a mapping server 226, which may be used to determine points of interest around the current location of the vehicle 110; weather server 228, which may be used to determine local weather conditions (e.g., is it a sunny day), and user profile database 230, which may store demographic information about the user (e.g., a driver), such as age, which could be useful in determining the user's interests. The user profile may also contain previously established user interests, either from other sources or from previous executions of the user interest detection module 202. These previously established user interests can be used to help infer future user interests. For example, a user who is a fan of one heavy metal band may be more likely to be a fan of another heavy metal band.

The user interest detection module 202 may be located in the vehicle 110, on a mobile device, or even on a separate server, such as a web server 116. The user interest detection module 202 may act to calculate a score for possible user interests, based on one or more of the factors described above. This score may be compared with a series of thresholds to determine which of a number of different user interests should be searched. The thresholds may be stored in a table.

The user interest detection module 202 may perform a search on the user interests from the Internet or another database. The results from this search may be presented by a user interface presentation module 232.

Figure 3:
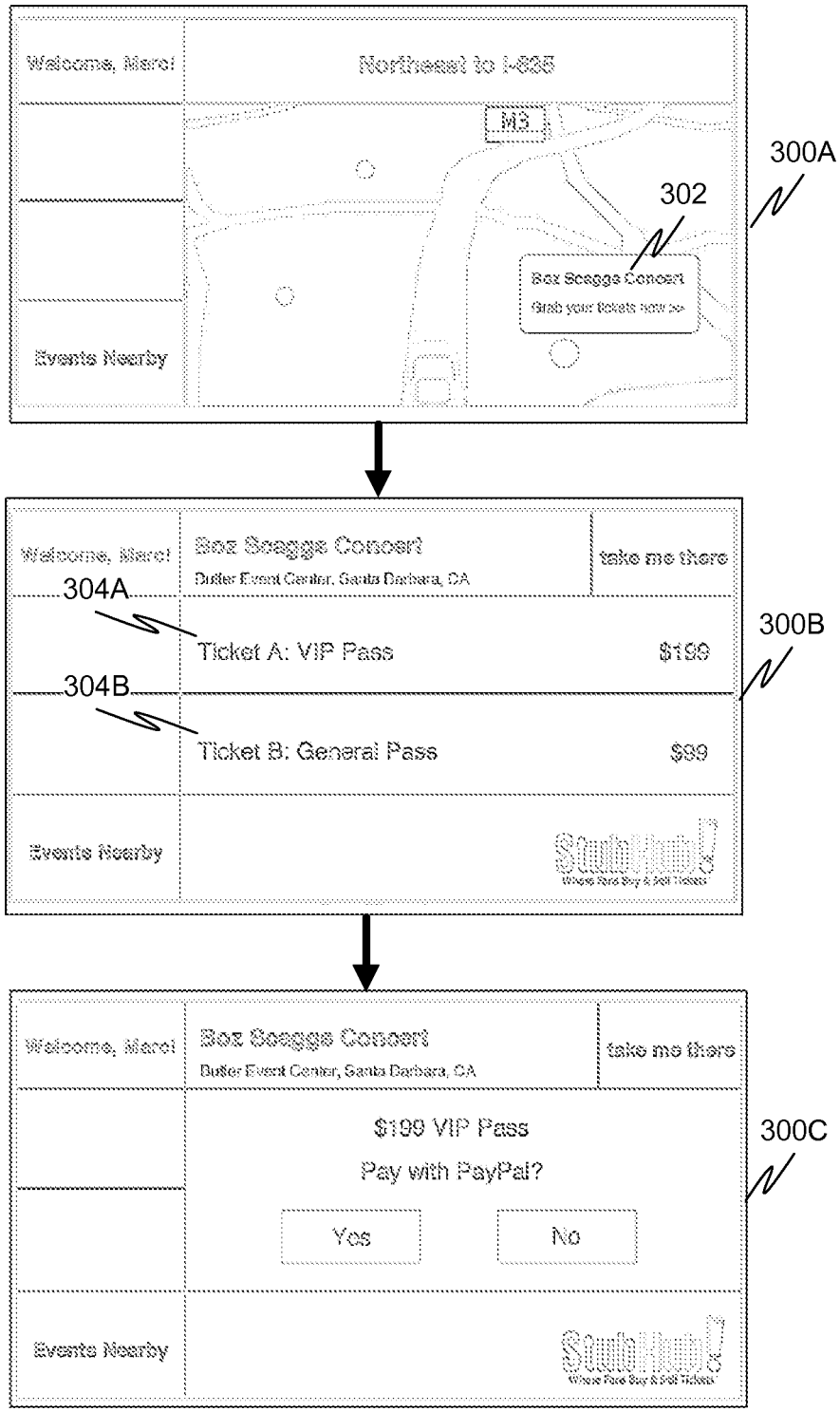
FIG. 3 is a sequence of screen captures illustrating a method, in accordance with an example embodiment, of performing an automatic search in a vehicle.

FIG. 3 is a sequence of screen captures illustrating a method, in accordance with an example embodiment, of performing an automatic search in a vehicle 110. Here, a user interest detection module 202 may detect that a user has an interest in the band "Boz Scaggs". This may be determined in a number of different ways. In an example embodiment, the user had been listening to a song by Boz Scaggs on the radio and tapped his or her fingers on the steering wheel to the beat. In another example embodiment, the user had whistled or sung along with the song as it played on the radio. This generated a first Internet search returning a list of Boz Scaggs concerts in the vicinity of the user. In the user interface screen capture 300A, it can be seen that a pop-up window 302 indicating that a Boz Scaggs concert is scheduled for the area can be displayed on top of a map. In an example embodiment, this pop-up window 302 may also indicate the location of the concert by being placed on or around the location on the map.

The user may then indicate that he or she has interest in the concert by, for example, pressing on a touchscreen over the pop-up window 302 to select the concert. In some embodiments, however, the user interest may simply be inferred so that active participation by the user is not required. For example, the system may simply assume that a concert with the closest location to the vehicle 110 is a concert the user has interest in. No matter how the concert is selected, once it is selected this may cause a second Internet search returning merchandise items related to the concert. While the merchandise can be any type of merchandise, in this example the merchandise are concert tickets. User interface screen capture 300B displays the results of this second Internet search. The user is then able to select from among available tickets 304A, 304B for the concert. Once tickets are selected, user interface screen capture 300C may display a payment window where the user can pay for the concert tickets through the vehicle interface. Thus, the user has been able to search for and purchase concert tickets through the user interface of the vehicle 110 without having to affirmatively search.

Figure 4:
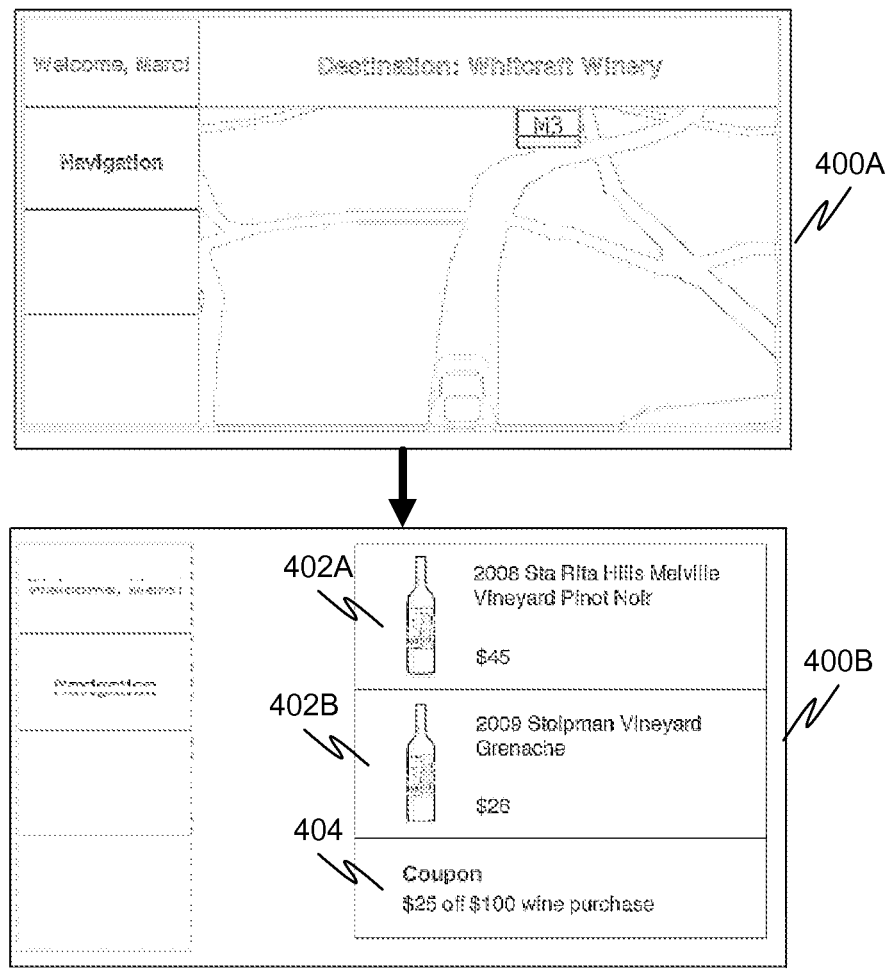
FIG. 4 is a sequence of screen captures illustrating a method, in accordance with another example embodiment, of performing an automatic search in a vehicle.

FIG. 4 is a sequence of screen captures illustrating a method, in accordance with another example embodiment, of performing an automatic search in a vehicle 110. Here the user has entered a destination in a navigation system. A user interest detection module 202 may detect that a user has an interest in some aspect related to the destination. In this example, user interface screen capture 400A indicates that the user has entered a destination of a winery. The user interest detection module 202 may then determine that the user has interest in wines from this winery and may automatically perform an Internet search for related items, which are displayed in user interface screen capture 400B. As can be seen, user interface screen capture 400B displays items 402A, 402B as well as a coupon 404.

Figure 5:
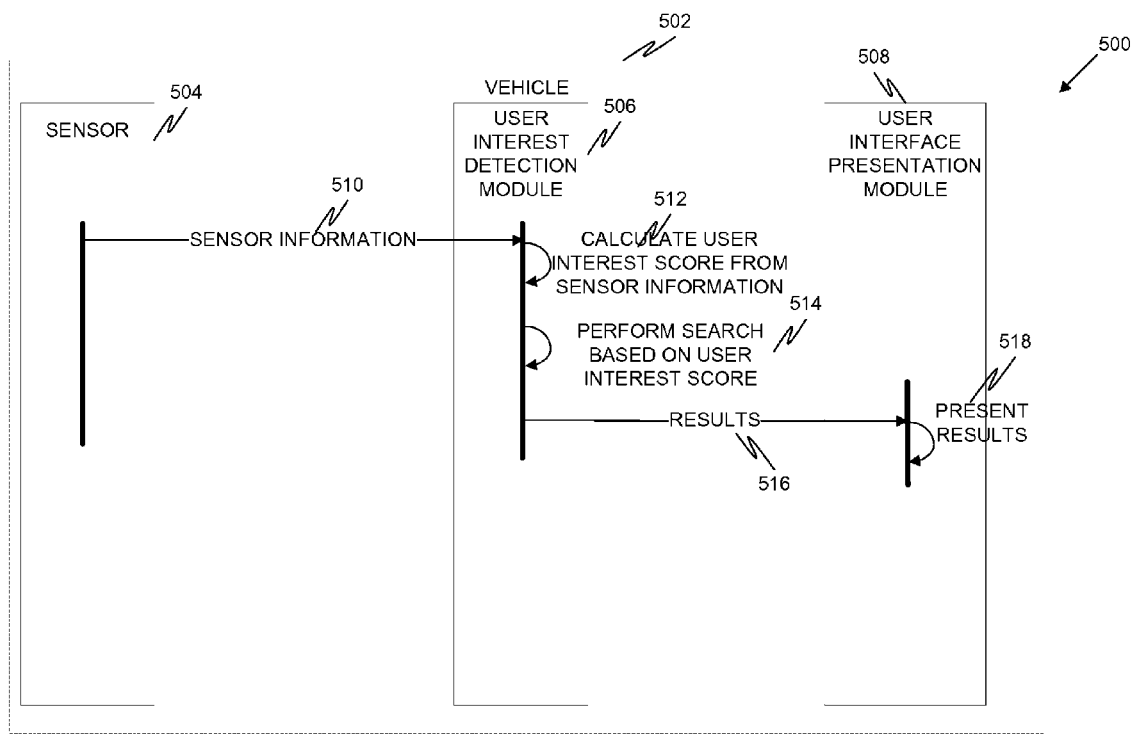
FIG. 5 is an interaction diagram illustrating a method, in accordance with an example embodiment, of automatically performing a search in a vehicle.

FIG. 5 is an interaction diagram illustrating a method 500, in accordance with an example embodiment, of automatically performing a search in a vehicle. In this method 500, a vehicle 502 may contain a sensor 504, a user interest detection module 506, and a user interface presentation module 508. At operation 510, the sensor 504 sends sensor information to the user interest detection module 506. At operation 512, a user interest score is calculated from the sensor information. At operation 514, a search is performed based on the user interest score. This search may be performed internally or externally. If externally, this may be communicated by, for example, a wireless communications standard such as Code Division Multiple Access (CDMA), Global System for Mobile Communication (GSM), 3G, 4G, or other wireless mechanism such as IEEE 802.11 or WiMAX, or any other wireless communication standard. At operation 516, the user interest detection module 506 sends results of the search to a user interface presentation module 508, which at operation 518 presents one or more of the results to a user.

Figure 6:
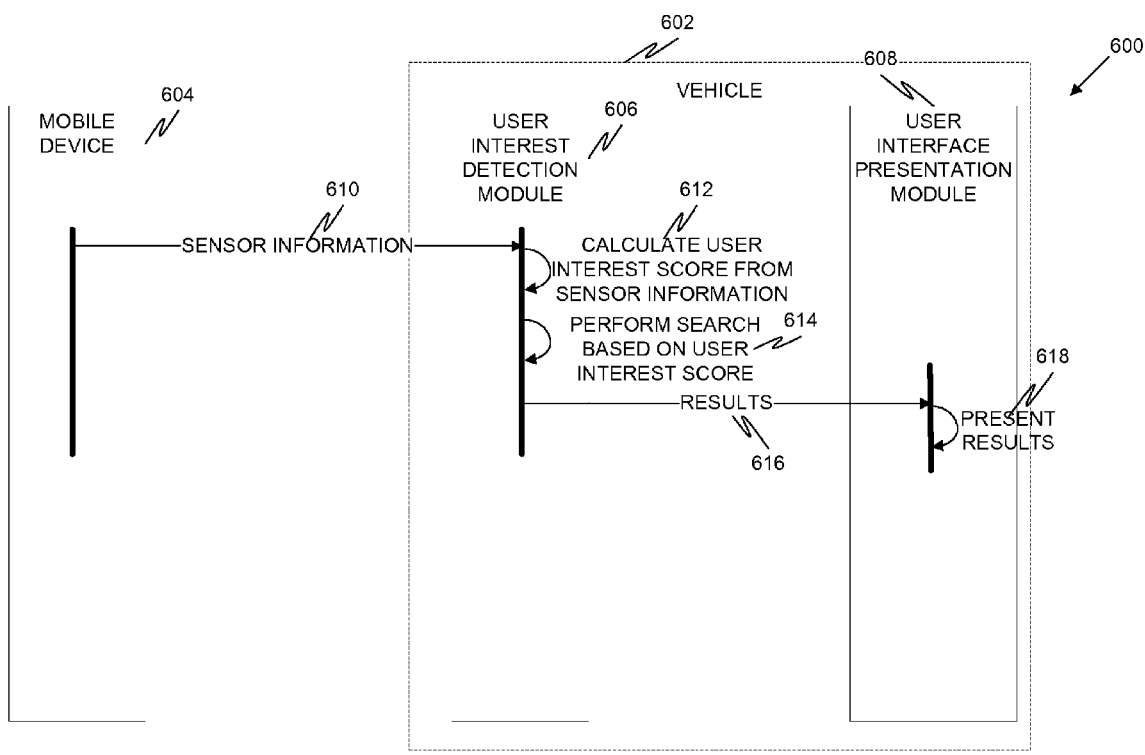
FIG. 6 is an interaction diagram illustrating a method, in accordance with another example embodiment, of automatically performing a search in a vehicle.

FIG. 6 is an interaction diagram illustrating a method 600, in accordance with another example embodiment, of automatically performing a search in a vehicle. In this method 600, a mobile device 604, such as a smartphone, may contain a sensor, separate from a vehicle 602 itself, which contains a user interest detection module 606 and a user interface presentation module 608. At operation 610, the mobile device 604 sends sensor information to the user interest detection module 606. At operation 612, a user interest score is calculated from the sensor information. At operation 614, a search is performed based on the user interest score. This search may be performed internally or externally. If externally, this may be communicated by, for example, a wireless communications standard such as 3G, 4G, LTE, Wi-Fi, or any other wireless communication standard. At operation 616, the user interest detection module 606 sends results of the search to a user interface presentation module 608, which at operation 618 presents one or more of the results to a user.

Figure 7:
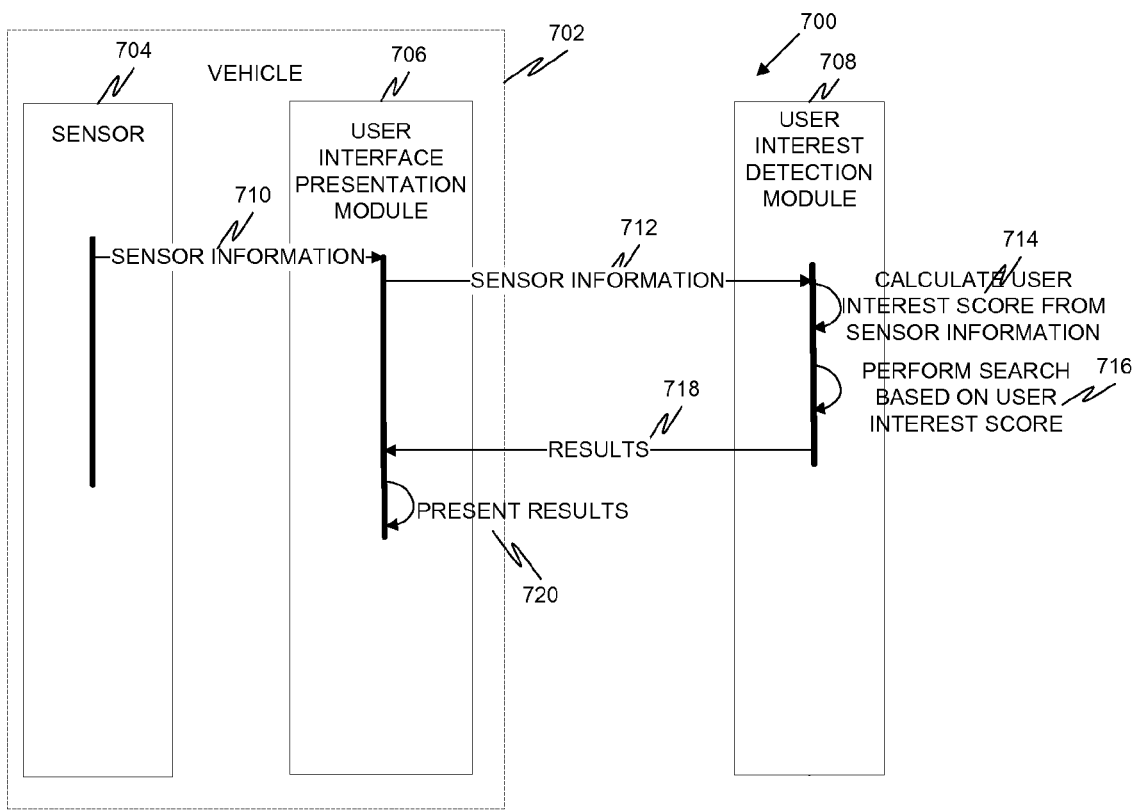
FIG. 7 is an interaction diagram illustrating a method, in accordance with another example embodiment, of automatically performing a search in a vehicle.

FIG. 7 is an interaction diagram illustrating a method 700, in accordance with another example embodiment, of automatically performing a search in a vehicle. In this method 700, a vehicle 702 may contain a sensor 704 and a user interface presentation module 706. A user interest detection module 708 may be located elsewhere, such as on a server. At operation 710, the sensor 704 may send sensor information to the user interface presentation module 706, which at operation 712 may communicate the sensor information to the user interest detection module 708. This may be communicated by, for example, a wireless communications standard such as 3G, 4G, LTE, Wi-Fi, or any other wireless communication standard. At operation 714, a user interest score is calculated from the sensor information. At operation 716, a search is performed based on the user interest score. At operation 718, the user interest detection module 708 sends results of the search to a user interface presentation module 706, which at operation 720 presents one or more of the results to a user.

Figure 8:
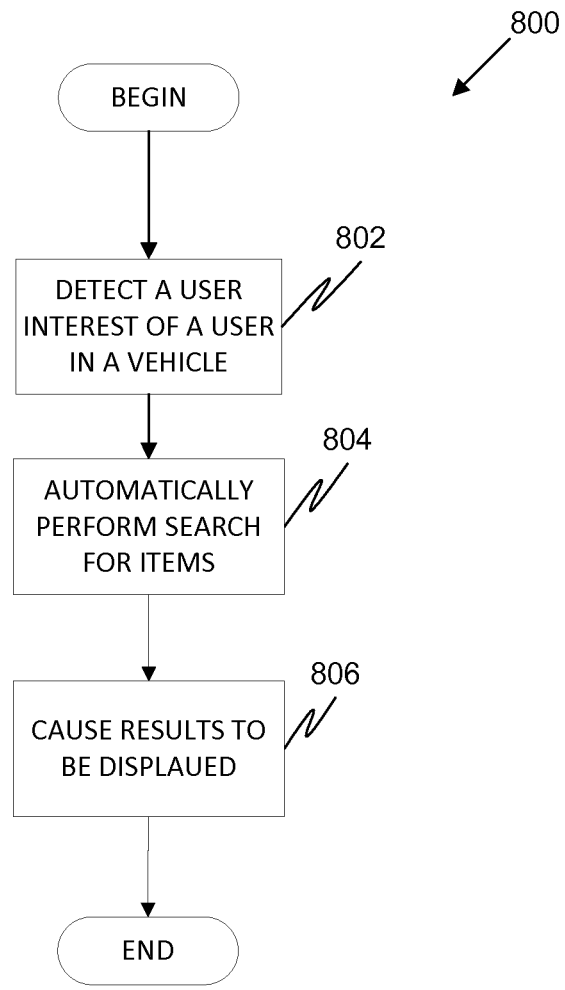
FIG. 8 is a flow diagram illustrating a method, in accordance with an example embodiment, of automatically performing a search based on user interest detected in a vehicle.

FIG. 8 is a flow diagram illustrating a method 800, in accordance with an example embodiment, of automatically performing a search based on user interest detected in a vehicle. At operation 802, a user interest of a user located in a vehicle is detected by examining sensor information from one or more sensors in the vehicle. At operation 804, a search is automatically performed for items relevant to the user interest. At operation 806, a user interface in the vehicle is then caused to display the items relevant to the user interest.

Figure 9:
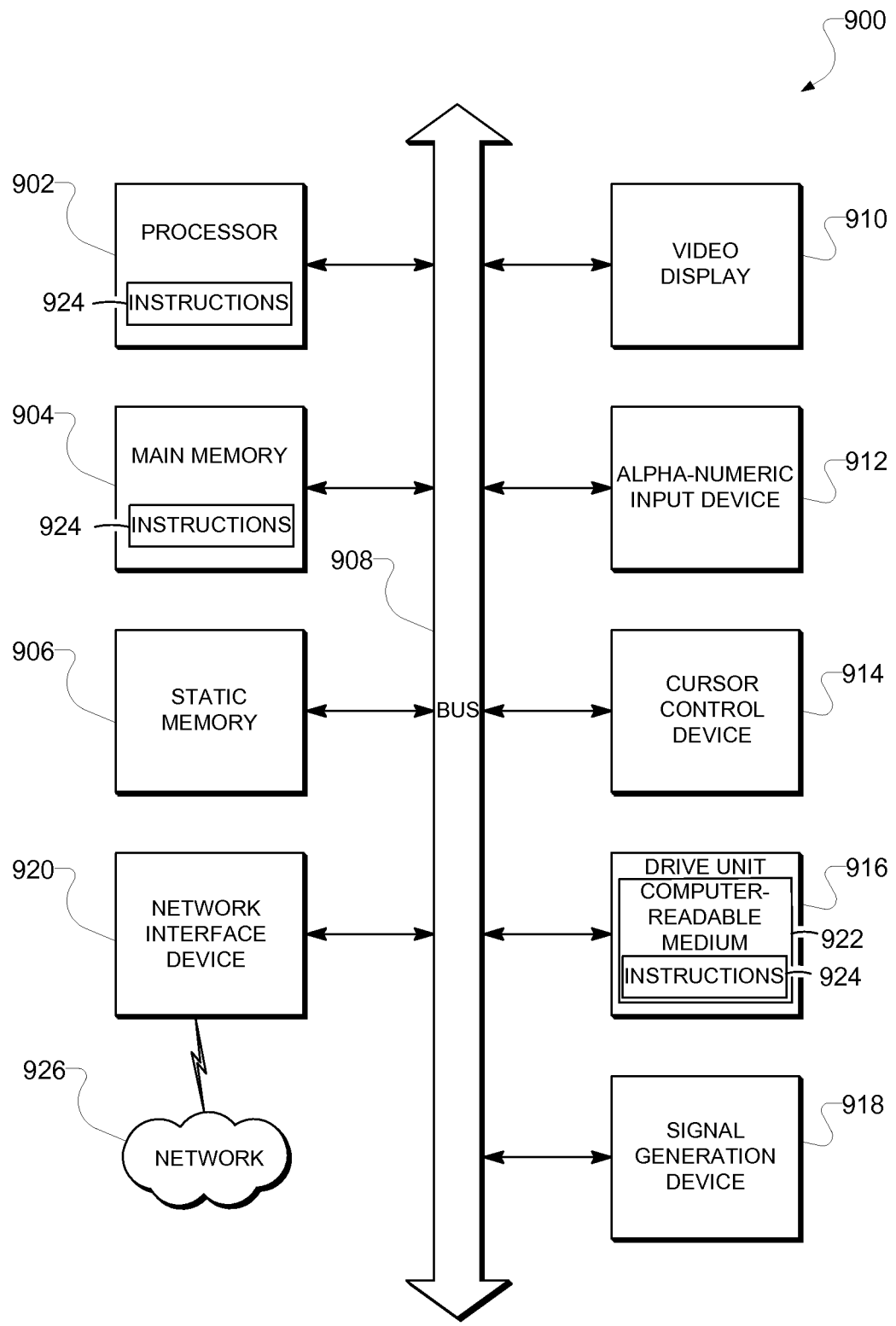
FIG. 9 shows a diagrammatic representation of a machine in the example form of a computer system within which a set of instructions for causing the machine to perform any one or more of the methodologies discussed herein may be executed.

FIG. 9 shows a diagrammatic representation of a machine in the example form of a computer system within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker), and a network interface device 920.

The disk drive unit 916 includes a computer-readable medium 922 on which is stored one or more sets of instructions 924 (e.g., software) embodying any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions 924. The term "machine-readable medium" shall also be taken to include any medium that is capable of storing, encoding or carrying a set of instructions for execution by the machine and that cause the machine to perform any one or more of the methodologies described herein. The term "machine-readable medium" shall accordingly be taken to include, but not be limited to, solid-state memories, optical and magnetic media, and carrier wave signals.

Although the inventive concepts have been described with reference to specific example embodiments, it will be evident that various modifications and changes may be made to these embodiments without departing from the broader spirit and scope of the inventive concepts. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

The invention claimed is:

1. An electronic device, comprising:
   a processor;
   a user interest detection module configured to:
      detect a user interest of a user in a vehicle by examining sensor information from one or more sensors in the vehicle, the detecting of a user interest including matching the sensor information to information from an audio device of the vehicle, the sensor information including tapping of fingers of the user while a song is playing through an audio system of the vehicle;
      automatically perform a search for items relevant to the user interest; and
      cause a user interface in the vehicle to display the items relevant to the user interest.

2. The electronic device of claim 1, wherein the electronic device is located in the vehicle.

3. The electronic device of claim 1, wherein the electronic device is a mobile device travelling in the vehicle.

4. The electronic device of claim 1, wherein the electronic device is a server in wireless communication with a user experience presentation module in the vehicle.

5. The electronic device of claim 1, wherein the items relevant to the user interest include merchandise related to the artist.

6. The electronic device of claim 1, wherein the sensor information includes information about a destination a user has programmed into a navigation system in the vehicle.

7. A method comprising:
   detecting a user interest of a user in a vehicle by examining sensor information from one or more sensors in the vehicle, the detecting of a user interest including matching the sensor information to information from an audio device of the vehicle, the sensor information including tapping of fingers of the user while a song is playing through an audio system of the vehicle;
   automatically performing a search for items relevant to the user interest; and
   causing a user interface in the vehicle to display the items relevant to the user interest.

8. The method of claim 7, wherein the method is performed on a server in wireless communication with the vehicle.

9. The method of claim 7, wherein the method is performed in the vehicle.

10. The method of claim 7, wherein the user interface includes a web page.

11. The method of claim 7, wherein the user interest is in an artist performing the song.

12. The method of claim 11, wherein the items relevant to the user interest include merchandise related to the artist.

13. The method of claim 7, wherein the sensor information includes information about a destination the user has programmed into a navigation system in the vehicle.

14. A non-transitory computer-readable storage medium comprising instructions that, when executed by at least one processor of a machine, cause the machine to perform operations comprising:
   detecting a user interest of a user in a vehicle by examining sensor information from one or more sensors in the vehicle, the detecting of a user interest including matching the sensor information to information from an audio device of the vehicle, the sensor information including tapping of fingers of the user while a song is playing through an audio system of the vehicle;
   automatically performing a search for items relevant to the user interest; and
   causing a user interface in the vehicle to display the items relevant to the user interest.

* * * * *